(12) United States Patent
Weng et al.

(10) Patent No.: US 9,182,233 B2
(45) Date of Patent: Nov. 10, 2015

(54) SYSTEM AND METHOD FOR AUTOCOMPLETION AND ALIGNMENT OF USER GESTURES

(75) Inventors: Fuliang Weng, Mountain View, CA (US); Zhongnan Shen, Milpitas, CA (US)

(73) Assignee: Robert Bosch GmbH, Stuttgart (DE)

( * ) Notice: Subject to any disclaimer, the term of this patent is extended or adjusted under 35 U.S.C. 154(b) by 342 days.

(21) Appl. No.: 13/474,127

(22) Filed: May 17, 2012

(65) Prior Publication Data

US 2013/0311916 A1 Nov. 21, 2013

(51) Int. Cl.
G01C 21/00 (2006.01)
G01C 21/36 (2006.01)
G06F 3/042 (2006.01)
G06F 3/0488 (2013.01)

(52) U.S. Cl.
CPC .......... G01C 21/005 (2013.01); G01C 21/3664 (2013.01); G06F 3/0425 (2013.01); G06F 3/04883 (2013.01)

(58) Field of Classification Search
CPC G06F 3/017; G06F 3/04883; G06F 17/30265
See application file for complete search history.

(56) References Cited

U.S. PATENT DOCUMENTS

| | | | |
|---|---|---|---|
| 2001/0035880 A1 | 11/2001 | Musatov et al. | |
| 2003/0055644 A1 | 3/2003 | Johnston et al. | |
| 2006/0089794 A1 | 4/2006 | DePasqua | |
| 2007/0288164 A1 | 12/2007 | Gordon et al. | |
| 2009/0100383 A1* | 4/2009 | Sunday et al. | 715/863 |
| 2009/0153492 A1 | 6/2009 | Popp | |
| 2010/0241431 A1 | 9/2010 | Weng et al. | |
| 2010/0281435 A1 | 11/2010 | Bangalore et al. | |
| 2011/0022292 A1* | 1/2011 | Shen et al. | 701/200 |
| 2011/0193795 A1 | 8/2011 | Seidman et al. | |
| 2013/0303192 A1* | 11/2013 | Louboutin et al. | 455/456.3 |

FOREIGN PATENT DOCUMENTS

| | | |
|---|---|---|
| EP | 1555601 A2 | 7/2005 |
| WO | 2009/124080 A1 | 10/2009 |

OTHER PUBLICATIONS

Li, "Gesture Search: A Tool for Fast Mobile Data Access," UIST '10: Proceedings of the Twenty-Third Annual ADM Symposium on User Interface Software and Technology: Oct. 3-6, 2010, New York, New York, USA (10 pages).

(Continued)

*Primary Examiner* — Jennifer To
*Assistant Examiner* — Terri Filosi
(74) *Attorney, Agent, or Firm* — Maginot Moore & Beck LLP

(57) ABSTRACT

In accordance with one embodiment, a navigation system includes a display device configured to detect user gestures, a data storage device including program instructions stored therein, a map stored within the data storage device, and a controller operatively coupled to the data storage device and the display device and configured to execute the program instructions to receive first user gesture data associated with a first portion of a first user gesture from the display device, generate a first predicted user gesture data based upon the stored map and the first user gesture data, and control the display device to render the first predicted user gesture data as the user is continuing the first user gesture.

20 Claims, 4 Drawing Sheets

(56) References Cited

OTHER PUBLICATIONS

Watson et al, "Ambient Storytelling for Vehicle-Driver Interaction," Mobile and Environmental Media Lab, University of Southern California School of Cinematic Arts, USA, at least as early as Mar. 19, 2011 (8 pages).
Zaragoza Adaptable Bus Stop, City of Zaragoza, Spain, with the SENSEable City Laboratory at MIT to rethink the bus stop, at least as early as Aug. 31, 2006 (1 page).
Aviation Pros website page, "Europcar Lands Touch-Screen Technology at Heathrow," available at least as early as May 4, 2012 (2 pages).
Speak4it features website page, "Looking for businesses in a certain area? You can circle the area on the map while you're speaking," available at least as early as May 16, 2012 (1 page).
Speak4it features website page, "Looking for businesses on a certain road? Trace the route with your finger while you're speaking," available at least as early as May 16, 2012 (1 page).
Sony SMARTHOME products website page, "Sony nav-u Portable Navigation System—NV-U44—Smarthome," available at least as early as Feb. 26, 2012 (1 page).
International Search Report and Written Opinion corresponding to PCT Application No. PCT/US2013/041416, mailed Sep. 2, 2013 (14 pages).
GoogleDevelopers: "Google Maps API Autocomplete", http://www.youtube.com/watch?v=8uODeeP3Qec, uploaded on Feb. 3, 2012, retrieved on Aug. 23, 2013 (video).
Bennett, Mike et al., "SimpleFlow: Enhancing Gestural Interaction with Gesture Prediction, Abbreviation and Autocompletion", Interact 2011, pp. 591-608, Jan. 1, 2011, Springer Berlin Heidleberg (18 pages).

\* cited by examiner

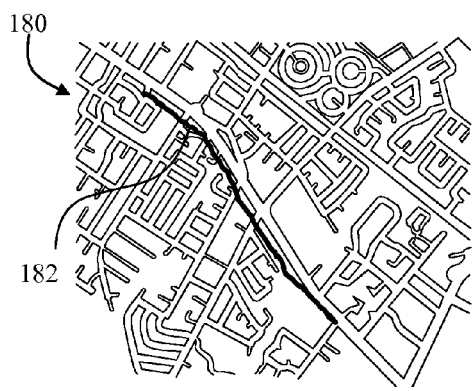 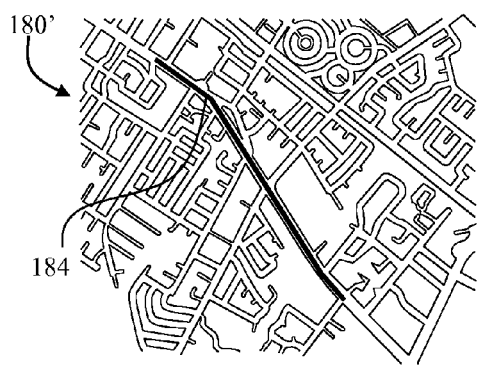
FIG. 3
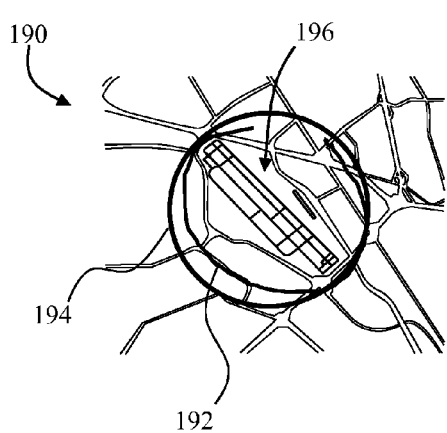 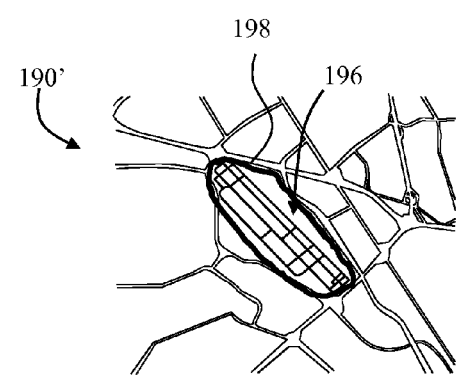
FIG. 4
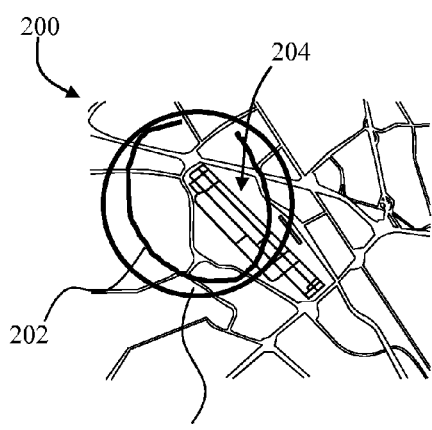 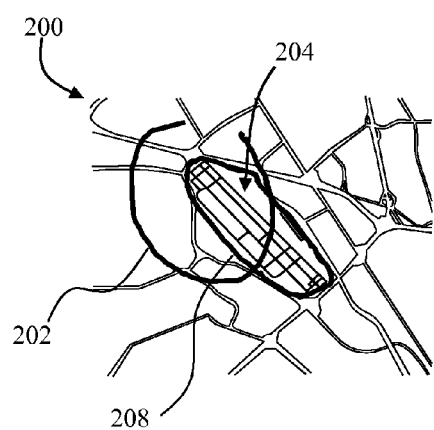
FIG. 5  FIG. 6

SYSTEM AND METHOD FOR AUTOCOMPLETION AND ALIGNMENT OF USER GESTURES

TECHNICAL FIELD

This disclosure relates generally to navigation systems such as those used in vehicles.

BACKGROUND

For a navigation system, such as an in-car system, speech provides a natural modality of interaction. Speech, however, is constrained by the limitation of the language. For example, if a user wants to find restaurants or other points of interest (POIs) in a specific geographical area or a specific segment of a street, it is difficult for the user to describe the specific geographical area with language.

The limitations of speech have been addressed in some systems which incorporate a touch screen. In some of these systems, a user can "draw" a circle around a specific geographic location on the map using "gestures". The drawing is made in a layer located above the depicted map. The system then applies the drawn geometric shape to the underlying map to specifically identify the geographic area of interest. Some of these systems can identify user gestures in the form of shapes, lines, and points. Thus, a user can use a circle-shaped gesture to identify a particular geographic region, or a line-shaped gesture to identify a street. In some known systems, once a specific geographic area is identified using gestures, various information about particular POIs within the specific geographic area may be extracted and communicated to the user.

While beneficial in many respects, known systems have various limitations. By way of example, while some systems include a form of error correction wherein a geographic shape is identified from one or more gestures which form an imperfect geometric shape, a user must still substantially complete the shape and then wait to see if the system correctly identifies the shape. The need to substantially complete drawing of the shape and then waiting to see if the system has correctly identified the shape results in undesired complication and delay. Such complications and delay can be distracting, particularly in situations where a driver of a vehicle is attempting to form the shape.

What is needed is a navigation system which intuitively identifies a geographic shape using partial gestures. A navigation system which predicts geographic areas based on user gesture data and conforms the predicted gesture data to a user-intended geographical feature of the map would be beneficial.

SUMMARY

In accordance with one embodiment, a navigation system includes a display device configured to detect user gestures, a data storage device including program instructions stored therein, a map stored within the data storage device, and a controller operatively coupled to the data storage device and the display device and configured to execute the program instructions to receive first user gesture data associated with a first portion of a first user gesture from the display device, generate a first predicted user gesture data based upon the stored map and the first user gesture data and/or information from another user input modality (e.g., voice channel), and control the display device to render the first predicted user gesture data as the user is continuing the first user gesture.

In a further embodiment, a navigation system includes a display device configured to detect user gestures, a data storage device including program instructions stored therein, a map stored within the data storage device, and a controller operatively coupled to the data storage device and the display device and configured to execute the program instructions to receive first user gesture data associated with a first portion of a user gesture from the display device, generate predicted user gesture data based upon the stored map and the first user gesture data, wherein the predicted user gesture data conforms to a geographical feature of the map, and control the display device to render the predicted user gesture data.

BRIEF DESCRIPTION OF THE DRAWINGS

FIG. 3 is an exemplary user interface screen displaying a gesture being made as well as displaying an associated predicted final user gesture.

FIG. 4 is an exemplary user interface screen displaying a gesture being made as well as a predicted final user gesture and an associated predicted final user gesture.

FIG. 5 is an exemplary user interface screen displaying a gesture being made and an associated predicted final user gesture.

FIG. 6 is an exemplary user interface screen displaying a gesture being made as well as an associated predicted final user gesture based upon voice modality data.

DETAILED DESCRIPTION

Figure 1:
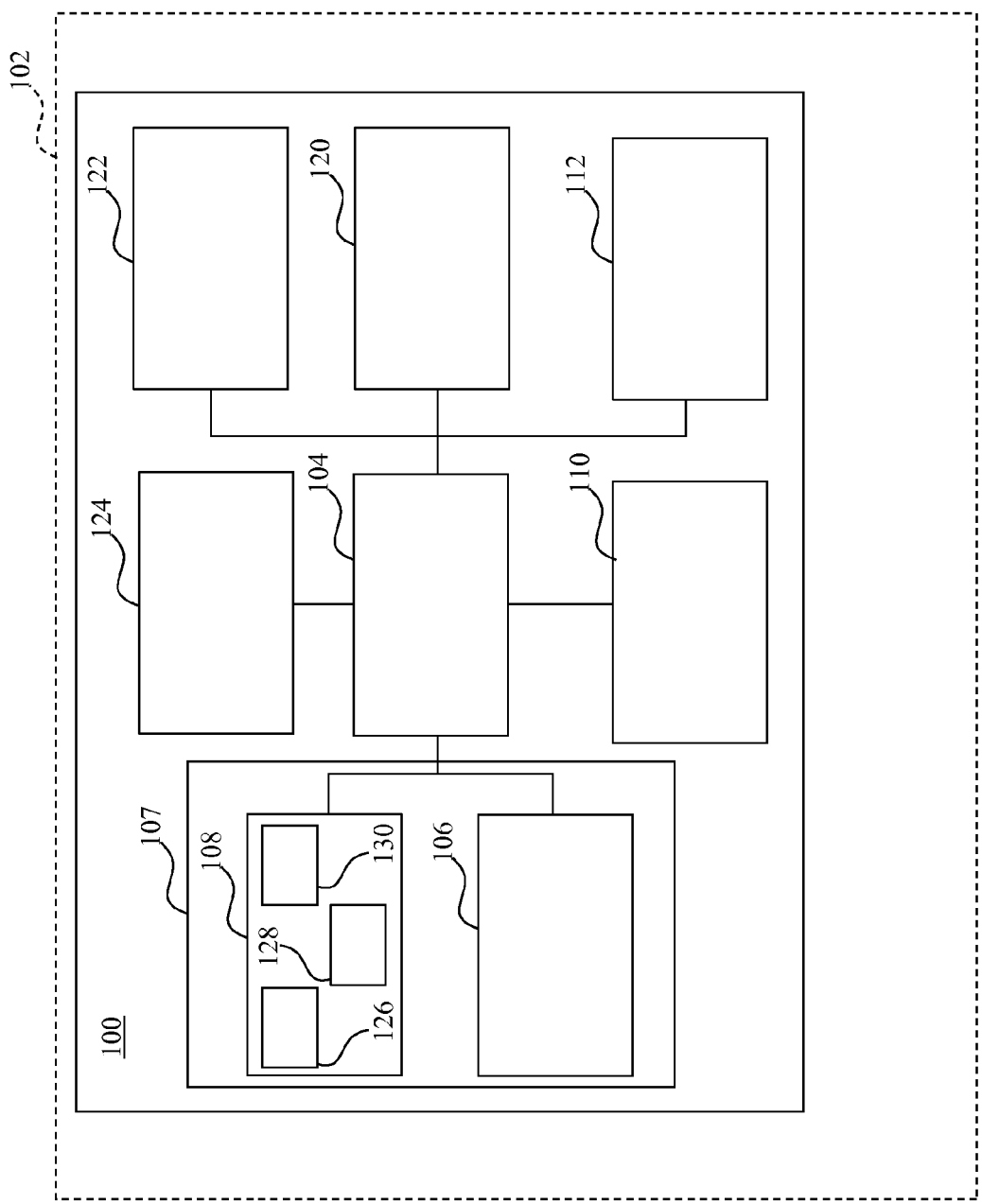
FIG. 1 is a schematic view of a control system that is configured to implement a navigation system in a vehicle.

FIG. 1 depicts a schematic diagram of a navigation system 100. The navigation system can be implemented in, for example, a handheld computer, a personal digital assistant, a cellular telephone, a network appliance, a camera, a smart phone, a media player, a gaming console, a vehicle console system, or a combination of any two or more of these data processing device or other data processing devices. In one example, the navigation system 100 is a vehicle navigation system and is located in a vehicle 102. The navigation system 100 includes a controller 104, a memory 107, display 110, audio output 112, input devices 120, radio frequency (RF) receiver 122, and a positioning system receiver 124.

The controller 104 is an electronic processing device such as a microcontroller, application specific integrated circuit (ASIC), field programmable gate array (FPGA), microprocessor including microprocessors from the x86 and ARM families, or any electronic device configured to perform the functions disclosed herein. Controller 104 may implement software and hardware functional units including a graphical processing unit (GPU) for generation of visual display data, as well as an audio digital signal processor (DSP) for generation of audible output signals. Controller 104 is configured to execute instructions corresponding to one or more software programs. While FIG. 1 depicts vehicle information system 100 using a single controller 104, various localization systems may use one or more controllers. Some or all of the functions provided by the memory 107, and RF receiver 122 may be integrated with the controller 104 using either hardware or software in a system on a chip (SoC) configuration.

The memory 107 can include one or more data storage system, such as a random access memory (RAM) 106, a non-volatile data storage system, or combination thereof. The RAM 106 may be embodied by any memory device that enables controller 104 to load and store data from the memory device in a random access. Example embodiments include dynamic RAM (DRAM) and static RAM (SRAM). RAM 106 is operatively coupled to the controller 104 and controller 104 may load and store program instructions and data in the RAM 106. In a typical embodiment, RAM 106 is volatile, meaning that contents of the RAM 106 are erased in the absence of electric power.

Non-volatile data storage device 108 may be implemented as a hard drive, solid state drive, or as any digital storage device that is configured to retain data in the absence of externally supplied electrical power. Data storage device 108 is operatively coupled with the controller 104. Data storage device 108 reads stored data and provides the data to the controller 104, and writes data in response to a write command from the controller 104. The data storage device 108 is configured to hold one or more stored programs 126 and stored data 128. Stored programs (also referred to herein as "program instructions") 126 include executable code to implement an operating system and one or more user space programs that execute within the operating system. Exemplary user space programs include web browsers and web servers.

The data storage device 108 further stores a symbolic map 130. The symbolic map 130 is a map which details the actual location of not only roads, but also of the lanes of the road. In other embodiments, navigation maps which simply detail the location of an undivided road as a single line, and divided roads with two lines (one line for each direction) are used. In some embodiments, the map 130 identifies the footprint of buildings such as malls, high-rises, etc.

Stored data 128 include various data files for use by one or more stored programs in operation. The stored data 128 contain one or more sets of configuration data that define the format of user interfaces for the programs in the stored program data 128. The configuration data may include CSS and XSLT files that define rules for generating a user interface. One embodiment of data storage device 108 includes multiple data storage devices where one data storage device is fixedly installed in the vehicle 102 and holds the program instructions 126, while a second data storage device holding data is configured to be connected to and removed from the vehicle 102.

Display 110 includes at least one visual display device, such as a liquid crystal display (LCD), organic light-emitting diode (OLED) display, or projection device. Different vehicle configurations may include one or more display devices at various locations in the vehicle 102, including heads-up displays that project an image in front of the operator when operating the vehicle 102. The controller 104 is operatively coupled to the display device 110 and generates signals corresponding to text and graphics for display on or by the display device 110. The display device 110 converts the generated signals into visual output. In one embodiment, the display device 110 includes a touch screen interface that enables an operator to touch one or more sections of the display 110 to input commands. The controller 104 is configured to take one or more actions in response to receiving generated signals from the display 110.

Audio output 112 typically includes one or more audio speakers that are operatively coupled to the controller 104. The audio output 112 may include various filters and amplifiers for processing of audio signals prior to output. The controller 104 generates one or more audio signals for the audio output 112, including audio and music received from the RF receiver 122 or held in stored data 128. Audio output 112 also emits sounds corresponding to synthetic speech signals that the controller 104 generates during operation.

RF receiver 122 is configured to receive radio frequency emissions using various modulation techniques on different frequencies. Common examples include analog AM and FM radio, terrestrial digital radio, satellite radio, as well as terrestrial and satellite video transmissions. The controller 104 may be configured to decode data received from the RF receiver 122 and to generate corresponding video and audio signals for the display 110 and audio output 112, respectively. In an alternative configuration, the RF receiver 122 generates signals for the display 110 and audio output 112 directly, and provides metadata to the controller 104. Various forms of metadata include audio and video titles, artist information, play lengths, audio video bit rates, and other information that may be provided to the operator through display 110 and audio output 112.

The positioning system 124 can be a global positioning system (GPS) receiver, a terrestrial radio navigation system receiver, or other system capable to derive positioning information. In one example, the positioning system 124 may be a commercially available GPS receiver which provides a nominal accuracy of about 10 meters or less. The GPS receiver 124 receives GPS signals for the purpose of determining the device's current location on Earth. The stored map 130 is provided in the GPS receiver 124 in some embodiments. The GPS receiver 124 may provide suggested directions to the occupants of the vehicle 102 via the display 110 and/or the audio output 112.

In operation, controller 104 obtains program instructions 126 from the data storage device 108 and executes the program instructions 126 to automatically complete and align user gestures with displayed features of the symbolic map 130. One method for automatically completing and aligning user gestures with displayed features of the symbolic map 130 is described with reference to FIG. 2.

Figure 2:
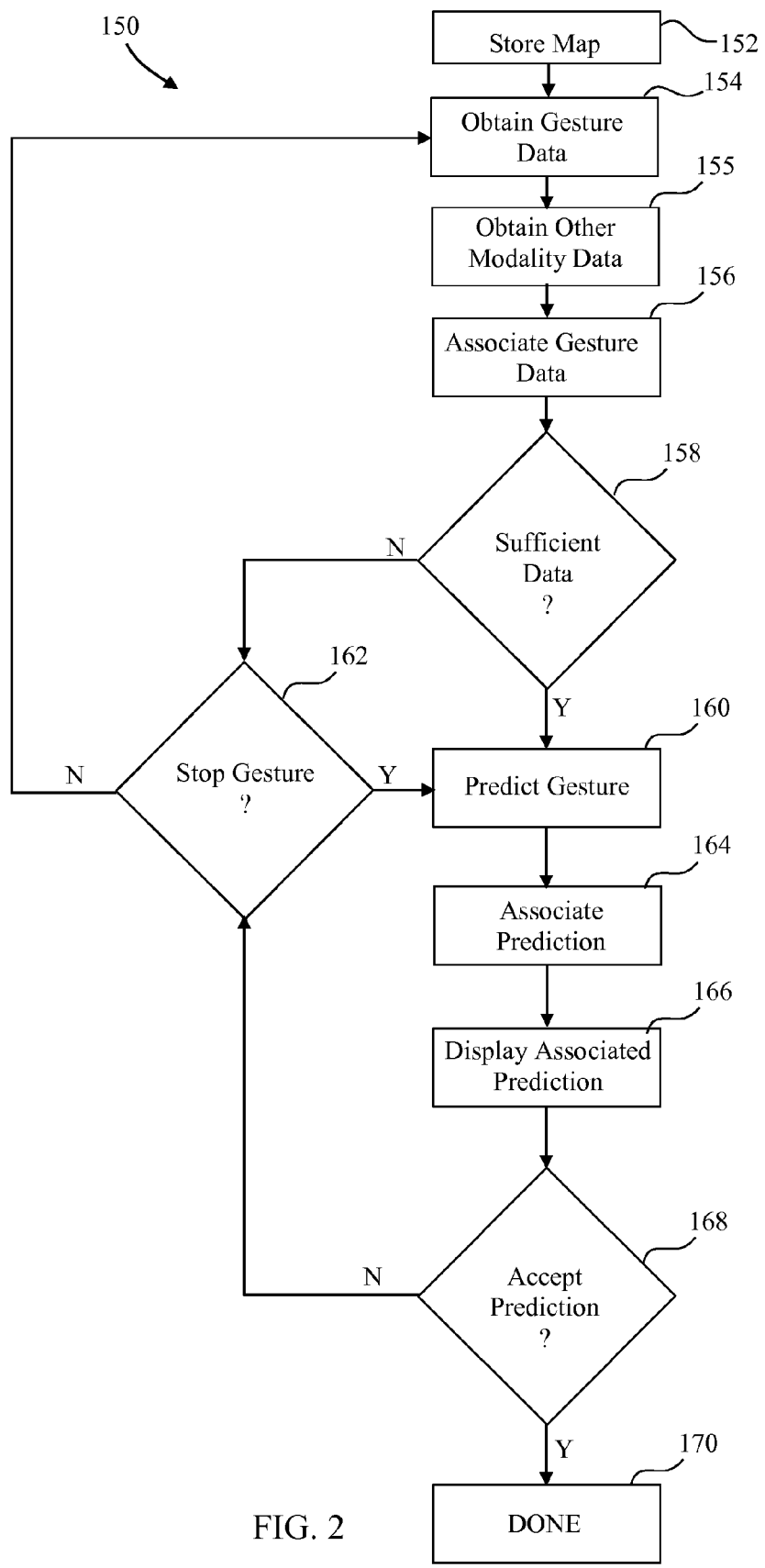
FIG. 2 is a block diagram of a process for obtaining gesture data and predicting a final user gesture based upon the obtained data and associated geographical features of a map.

FIG. 2 depicts a process 150 which begins with storing the symbolic map 130 within the non-volatile data storage 108 (block 152). The symbolic map 130 may be stored in a non-volatile data storage 108 provided with the vehicle or in a separately obtained non-volatile data storage 108, such as in a portable GPS receiver. The symbolic map 130 may be updated periodically, such as by using data obtained from the RF receiver 122 to provide updated lane data, such as temporary cross-over lanes established during construction, as well as newly defined geographical areas.

At block 154, gesture data is obtained from the display 110. In one embodiment, the gesture data is obtained as a user physically touches the display 110. In another embodiment, gesture data is obtained by tracking an object using a camera or other detector wherein physical contact is not needed. Data from other modalities such as voice or keyboard is also obtained at block 155.

The controller 104 associates the obtained gesture data with the displayed geographical features obtained from the stored map 130 (block 156). In making the association, data from other modalities is combined with the gesture data in some embodiments. Association based upon other modalities is discussed in further detail below.

Once gesture data has been associated with the displayed map, the controller 104 determines whether or not sufficient gesture data has been obtained to predict the intended gesture of the user at block 158. This decision at block 158 occurs for the first time as the user is making a gesture. If sufficient data is available, then at block 160 the controller predicts the intended final user gesture at block 160. If there is not sufficient data at block 158, then the process proceeds to block 162.

If at block 162 the user has not stopped the gesture, the process continues to block 154 and additional gesture data is obtained. If the user is not gesturing at block 162, then the process continues to block 160 and a predicted gesture is generated by the controller 104 using the obtained gesture data. The controller then attempts to associate the predicted final user gesture with geographical features of the map at block 164. The association may be based upon a desired correlation factor between the predicted final user gesture and geographical features of the map.

By way of example, if the predicted final gesture is a line or a poly-line, the controller 104 may attempt to associate the predicted final gesture with one or more roadways in the map. The correlation between the predicted final gesture and the particular roadways may be made based upon the distance between the obtained gesture data and the one or more roadways, as well as the extent to which the obtained gesture data follows the general shape of the one or more roadways.

In scenarios wherein the predicted final gesture is a closed shape, the controller 104 first attempts to associate the closed shape with a defined geographical area such as a park, a mall, or an airfield. If sufficient correlation is present, then the predicted final gesture is associated with the defined geographical area. In embodiments where a user has provided a voice instruction in addition to the gesture, the voice instruction may be used to assist in associating the gesture with a geographical area. Thus, if the user says "airport", or "mall", or "park", sufficient correlation may be present even if the user gesture is not very accurate. If there is no defined geographical area which correlates sufficiently with the predicted final gesture, then the predicted final gesture is associated with the closest geometric shape (e.g., circle, oval, square, etc.).

Within block 158, 160, and 164, the system may be modified in a number of ways to better perform for a particular situation. Thus, in some embodiments a low correlation threshold between predicted final user gestures and geographical features may be used at block 164. In low threshold embodiments, the first associated predicted final gesture may be a line which is associated with the nearest street that extends generally along the user gesture. In other embodiments, a high correlation threshold between the predicted final gesture and geographical features may be used at block 164. In high threshold embodiments, the first associated predicted final gesture may be a line or a more complex shape. Since the high threshold system has a higher correlation threshold, a confidence factor associated with the first predicted gesture will be higher.

In some embodiments, the correlation threshold used in block 164 and the data threshold at block 158 varies depending upon how many times the controller 104 has made a predicted gesture. In some embodiments, previously predicted gestures are excluded from further predicted gestures at block 160.

Once the predicted final user gesture has been associated with either a geometric shape or a geographically defined feature (road, outline of a park, etc.), then at block 166 the associated predicted final user gesture is displayed. The controller 104 then determines whether or not the user accepts the associated predicted final user gesture (block 168). If the associated predicted final user gesture is accepted, then at block 170 the process 150 stops. Acceptance is indicated in some embodiments simply by cessation of user gesturing.

If the associated predicted final user gesture is not accepted, then the process continues at block 162. In some embodiments, continued user gesturing for more than a predetermined time after the associated predicted final user gesture is displayed at block 166 is a rejection of the displayed associated predicted final user gesture. If the associated predicted final user gesture is not accepted, then the process obtains additional gesture data (block 154) so as to generate a second predicted final user gesture.

As noted above, final user gestures are aligned with related geographical entities and the alignment displayed on the screen for a better presentation in some embodiments. FIG. 3 depicts a display 180 upon which a user has drawn a gesture 182. The controller 104 in this embodiment generates a display line of the actual user gesture as the gesture is being made so that the user has feedback as to the detected user gesture even before a predicted gesture is displayed.

FIG. 3 further depicts the display 180' wherein the controller 104 has caused an associated predicted final user gesture 184 to be displayed. As is evident by comparing the gesture 182 and the predicted final user gesture 184, the controller 104 has aligned the gesture 182 with a geographical feature in the form of a road which is spaced apart from the gesture 182 but which follows the general extent of the gesture 182.

FIG. 4 depicts a display 190 upon which a user has drawn a gesture 192. The gesture 192 is not a completed shape, but based upon the gesture 192 and the geographical features in the display 190, the controller 104 determines that the final user gesture will be a closed oval. This predicted final user gesture is indicated in display 190 by a predicted final user gesture 194. The controller 104 further determines, however, that the final predicted gesture 194 is associated with a geographical feature 196 which in this example is an airfield. Accordingly, the controller 104 generates a display 190' wherein the associated predicted final gesture 198 is displayed.

In some embodiments, the predicted final user gesture (from block 160) and the associated predicted final user gesture (from block 164) are displayed. In other embodiments, only the associated predicted final user gesture (from block 164) is displayed. In embodiments wherein both the predicted final user gesture and the associated predicted final user gesture are displayed, different colors or some other characteristic may be used to allow a user to distinguish between the displayed predicted gestures.

As discussed above, the incorporation of data from other modalities may be used to assist in associating a gesture with a geographic area. By way of further example, FIG. 5 depicts a display 200 with a gesture 202. Because the gesture 202 does not have sufficient correlation to the airport 204, the system 100 simply generates a circular gesture 206.

FIG. 6 depicts the same display 200 and gesture 202. In the embodiment of FIG. 6, however, a user has provided voice modality data by saying "airport". Accordingly, the system 100 uses the additional voice modality data to correlate the gesture 202 with the airport 204, and therefore renders an associated predicted final user gesture 208 which conforms to the boundaries of the airport 204.

Figure 7:
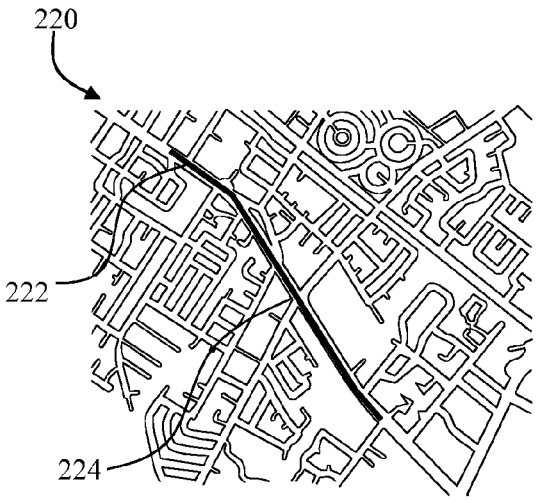
FIG. 7 is an exemplary user interface screen displaying a gesture being made and an associated predicted final user gesture.

Once an associated predicted gesture has been displayed, a user may modify the displayed associated predicted gesture. FIG. 7 depicts a display 220 with a predicted final user gesture 222. The predicted final user gesture 222 is close to what a user wants displayed. The user, however, wants to avoid going through an intersection 224. Accordingly, the user simply selects the predicted final user gesture 222, such as by touching the predicted final user gesture 222 or by speaking "reroute", and then drags a portion of the predicted final user gesture 222 to a desired bypass 226 shown in FIG. 8. In response, the system 100 generates a new predicted final user gesture, and renders an associated predicted gesture 228 (see FIG. 9) which bypasses the intersection 224.

In another embodiment, the user simply selects the gesture and erases a portion of the route to force the system 100 to generate a new route which does not include the erased portion. Portions of gestures may be erased by using a scribbling motion or making an "x" over the segment that is to be erased. In some embodiments, simply selecting the segment of the gesture and speaking the command "erase" is used.

Figure 8:
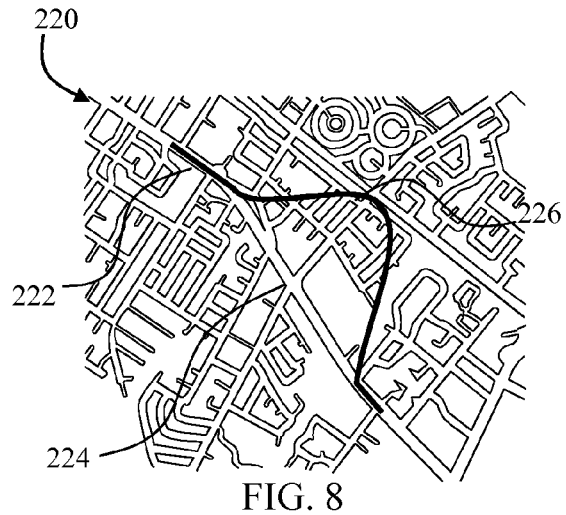
FIG. 8 is the exemplary user interface screen of FIG. 7 after a user has selected the associated predicted final user gesture and modified the associated predicted final user gesture by dragging a segment of the associated predicted final user gesture.
Figure 9:
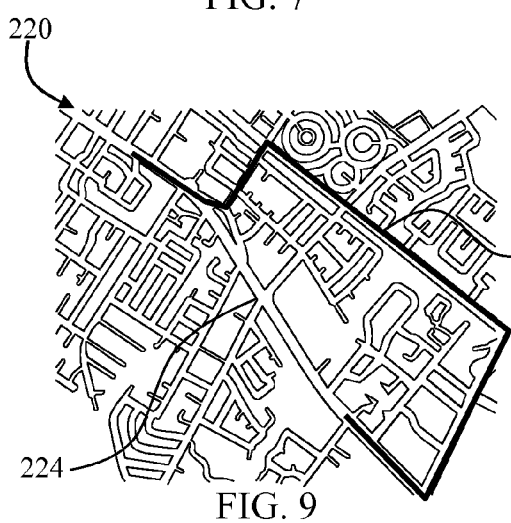
FIG. 9 is the exemplary user interface screen of FIG. 7 displaying an associated predicted final user gesture based upon user gesture modification data.
Figure 10:
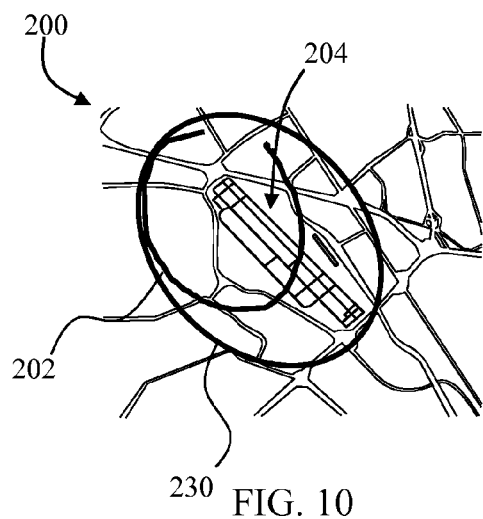
FIG. 10 is the exemplary user interface screen of FIG. 5 after a user has selected the associated predicted final user gesture and modified the associated predicted final user gesture by dragging a segment of the associated predicted final user gesture.

The "click and drag" modification of a gesture as described with respect to FIGS. 7-9 may also be used with the gesture 206 of FIG. 5. This is particularly useful in embodiments which do not incorporate modalities such as voice commands. Accordingly, if the circular gesture 206 is rendered and the user wants to identify the airport 204, the user simply selects the gesture 206 and stretches it to cover the airport as indicated by gesture 230 of FIG. 10. The system 100 then correlates the gesture 230 with the airport 204, and renders the display 200 of FIG. 6.

The above described process of displaying various types of predicted gestures provides the user with feedback that the gesture is matched correctly to the identified geographical entity.

The navigation system 100 in some embodiments is further configured to filter points of interest (POIs). This is accomplished in some embodiments by entering a POI mode. In some embodiments, gestures in the form of points are defined for the POI mode. When a "point" gesture is identified, only POIs near the location specified by the point are displayed on the map. A default radius is used to define "nearby" POIs which are displayed in a circle centered at the point gesture and within the default radius.

In some embodiments, a "line" gesture is defined for the POI mode. When a line gesture is identified, POIs on or near the line are displayed on the map. To find POIs, sample the line and find POIs near the sampling points. To check if a POI is on the line, the distance between the POI and the line can be calculated. If the distance is within a defined threshold, the POI is treated as on the line. In some embodiments, the user defines the allowed distance between a line and a POI in order for the POI to be considered as on the line.

In some embodiments, a "circle" gesture is defined for the POI mode. When a circle gesture is identified, only POIs in the circle are displayed on the map. To check if a POI is in the circle, the distance between the POI and the center of the circle is calculated. If the distance is less than the radius of the circle, the POI is treated as in the circle. In some embodiments, the user defines the allowed radius. User definition of the radius of the circle may be accomplished by selecting the gesture and then dragging a portion of the circle to increase the size of the circle. Accordingly, if no POIs are identified in the original circle, a user can easily increase the size of the circle to identify a larger geographic area.

In some embodiments, an "oval" gesture is defined for the POI mode. When an oval gesture is identified, only POIs in the oval are displayed on the map. To find POIs in an oval, POIs in the area just outside of a circle are identified, and then POIs are filtered by the oval.

In some embodiments, a closed gesture is defined for the POI mode. If a closed gesture is identified, only POIs in the closed gesture are displayed on the map. The first point and the last point in the closed gesture may be connected to form a closed area. To find POIs in the closed gesture, the controller 104 first finds POIs in the closest outside circle of the closed gesture. For each found POI, the controller 104 determines if the POI falls in the area enclosed by the closed gesture.

In some embodiments, an open gesture is defined for the POI mode. If an open gesture is identified, only POIs on the open gesture are displayed on the map. In one embodiment, the open gesture is treated as a poly-line with many small line segments. In another embodiment, a regression line for all the points on the open gesture is identified, and the regression line is used to find POIs. The found POIs are filtered by the open gesture which is treated as a poly-line. The open gesture may be sampled to reduce number of calculations.

In some embodiments, poly-lines are identified for the POI mode. If a poly-line is identified, only POIs on or near the poly-line are displayed on the map. To find POIs, the poly-line is sampled to identify POIs near the sampling points. To check if a POI is on the poly-line, the distances from the POI to all the line segments in the poly-line are calculated. The minimum distance is taken as the distance between the POI and the poly-line. If the distance is within a defined threshold, the POI is treated as on the poly-line.

Once a set of POIs has been identified using any of the foregoing gestures, additional gestures may be used to modify the displayed POI. By way of example, a point gesture may be used to "select" a displayed POI. Once selected, additional information about the POI may be displayed. Additionally, the system 100 is configured such that another user gesture may be used to delete the selected POI from the display. By way of example, an "X" may be drawn across the POI to indicate to the controller 104 that the POI should be removed from the display. Accordingly, the user is able to filter the POIs.

As noted above, the system 100 is configured to allow the user to "select" a particular gesture. After a gesture is selected, the user can modify its shape or size by dragging or other movements. The user can also remove a gesture by applying a "back-and-forth" gesture on the gesture to be removed. The "back-and-forth" gesture is called "erase gesture". The form of the erase gesture is not limited to the "back-and-forth" movement. It could be any other defined movements. The erase gesture can be applied to the whole screen to have the screen cleared.

Gestures may thus be used to identify origin, destination, locations to go through, and locations to be avoided in a route planning process. A "point gesture" can be used to identify starting location, a destination location, and/or stop-by location. A line, poly-line or open gesture can be used to identify a destination street (the midpoint of the street may be used to be the destination location), a street to go through or a street to be avoided. A circle, oval or closed gesture can be used to identify destination area (the center point of the circle, oval or closed gesture may be used to be the destination location), an area to go through or an area to be avoided.

While gestures have been described above as being used to identify relatively large geographic areas, the gestures can be used to identify much smaller areas. Accordingly, a foot print of a building, such as a mall or a high-rise, may be depicted by the map 130 and associated with a gesture. The system 100 then is used to identify POIs within the particular building. Additionally, association of a gesture with a feature of the map 130 is not limited to geographic areas. Gestures may also be associated with names which are stored in the map 130. Thus, a user may use a gesture to encircle a name of a city, building or place. In response the system 100 renders an associated user gesture about the geographic boundaries of the city, building or place. By way of example, a gesture about the name "San Jose International Airport" in FIG. 5 results in the associated predicted final user gesture 208 of FIG. 6.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

What is claimed is:

1. A navigation system comprising:
   a display device configured to detect user gestures;
   a data storage device including program instructions stored therein;
   a map stored within the data storage device; and
   a controller operatively coupled to the data storage device and the display device and configured to execute the program instructions to:
   receive first user gesture data associated with a first portion of a first user gesture from the display device;
   generate a first predicted user gesture data based upon the stored map and the first user gesture data; and
   control the display device to render the first predicted user gesture data as the user is continuing the first user gesture;
   wherein the controller is further configured to execute the program instructions to:
   identify a plurality of points of interest associated with the rendered first predicted user gesture data;
   control the display device to render data associated with the identified plurality of points of interest;
   receive second user gesture data associated with a second user gesture from the display device;
   associate the second user gesture data with one of the identified plurality of points of interest; and
   modify the rendered data associated with the identified plurality of points of interest to exclude any data associated with the one of the identified plurality of points of interest.

2. The navigation system of claim 1, wherein the display device is configured to detect tactile user gestures.

3. The navigation system of claim 1, wherein the controller is further configured to execute the program instructions to:
   generate the first predicted user gesture data by associating the first portion of the first user gesture with a geographical feature.

4. The navigation system of claim 3, wherein the first predicted user gesture data conforms to the geographical feature.

5. The navigation system of claim 4, wherein the geographical feature comprises at least one roadway.

6. The navigation system of claim 4, wherein the geographical feature comprises a geographically identifiable area.

7. The navigation system of claim 1 wherein the controller is further configured to execute the program instructions to:
   receive second user gesture data associated with a second portion of the first user gesture from the display device after controlling the display device to render the first predicted user gesture data as the user is continuing the first user gesture;
   generate a second predicted user gesture data based upon the stored map, the first user gesture data, and the second user gesture data; and
   control the display device to render the second predicted user gesture data as the user is continuing the first user gesture.

8. The navigation system of claim 1, wherein the controller is further configured to execute the program instructions to:
   receive non-gesture user input modality data; and
   generate the first predicted user gesture data based upon the stored map, the first user gesture data, and the non-gesture user input modality data.

9. The navigation system of claim 8, wherein the non-gesture user input modality data comprises voice data.

10. The navigation system of claim 1, wherein the controller is further configured to execute the program instructions to:
    select the rendered first predicted user gesture data based upon user input; and
    modify the rendered first predicted user gesture data based upon user input.

11. A navigation system comprising:
    a display device configured to detect user gestures;
    a data storage device including program instructions stored therein;
    a map stored within the data storage device; and
    a controller operatively coupled to the data storage device and the display device and configured to execute the program instructions to:
    receive first user gesture data associated with a first portion of a first user gesture from the display device;
    generate first predicted user gesture data based upon the stored map and the first user gesture data, wherein the first predicted user gesture data conforms to a geographical feature of the map; and
    control the display device to render the first predicted user gesture data;
    wherein the controller is further configured to execute the program instructions to:
    identify a plurality of points of interest associated with the rendered first predicted user gesture data;
    control the display device to render data associated with the identified plurality of points of interest;
    receive second user gesture data associated with a second user gesture from the display device;
    associate the second user gesture data with one of the identified plurality of points of interest; and
    modify the rendered data associated with the identified plurality of points of interest to exclude any data associated with the one of the identified plurality of points of interest.

12. The navigation system of claim 11, wherein the controller is further configured to execute the program instructions to:
    control the display device to render the first predicted user gesture data as the user is continuing the first user gesture.

13. The navigation system of claim 11, wherein the display device is configured to detect tactile user gestures.

14. The navigation system of claim 11, wherein geographical feature comprises at least one roadway.

15. The navigation system of claim 11, wherein the geographical feature comprises a geographically identifiable area.

16. The navigation system of claim 11 wherein the controller is further configured to execute the program instructions to:
- receive second user gesture data associated with a second portion of the first user gesture from the display device after controlling the display device to render the first predicted user gesture data;
- generate a second predicted user gesture data based upon the stored map, the first user gesture data, and the second user gesture data; and
- control the display device to render the second predicted user gesture data.

17. The navigation system of claim 16, wherein the controller is further configured to execute the program instructions to control the display device to render the second predicted user gesture data as the user is continuing the first user gesture.

18. The navigation system of claim 11, wherein the controller is further configured to execute the program instructions to:
- receive non-gesture user input modality data; and
- generate the first predicted user gesture data based upon the stored map, the first user gesture data, and the non-gesture user input modality data.

19. The navigation system of claim 18, wherein the non-gesture user input modality data comprises voice data.

20. The navigation system of claim 11, wherein the controller is further configured to execute the program instructions to:
- select the rendered first predicted user gesture data based upon user input; and
- modify the rendered first predicted user gesture data based upon user input.

* * * * *